June 28, 1960 R. W. HILTON 2,942,728
METHOD OF AND APPARATUS FOR MAKING EXTRUDED TUBING
Filed Oct. 22, 1957 3 Sheets-Sheet 1

INVENTOR.
RALPH W. HILTON
BY
ATTORNEY

June 28, 1960 R. W. HILTON 2,942,728
METHOD OF AND APPARATUS FOR MAKING EXTRUDED TUBING
Filed Oct. 22, 1957 3 Sheets-Sheet 2

INVENTOR.
RALPH W. HILTON
BY
ATTORNEY

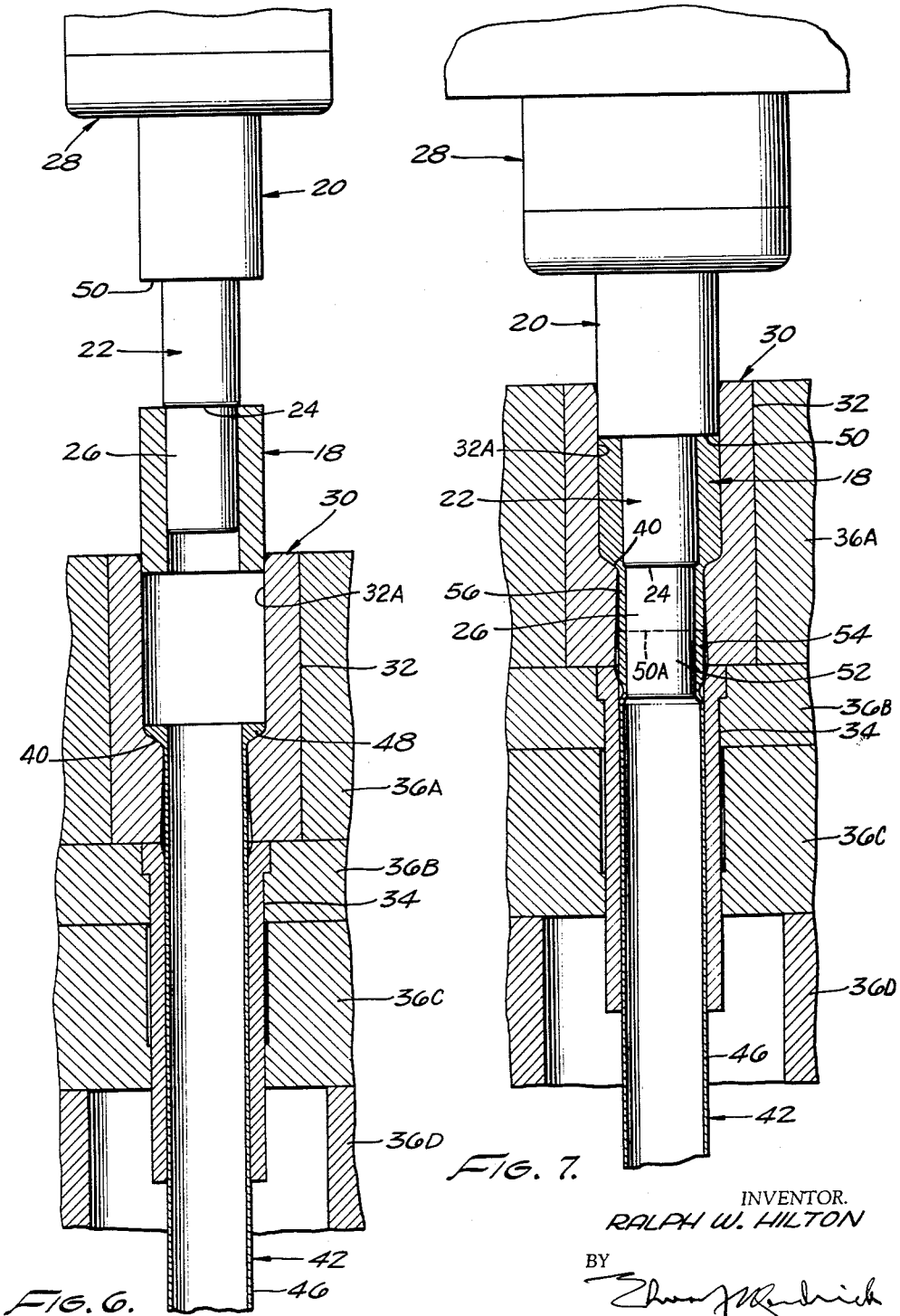

United States Patent Office 2,942,728
Patented June 28, 1960

2,942,728

METHOD OF AND APPARATUS FOR MAKING EXTRUDED TUBING

Ralph W. Hilton, Palos Verdes Estates, Calif., assignor to Harvey Machine Co., Inc., Torrance, Calif., a corporation of California Filed Oct. 22, 1957, Ser. No. 691,649

2 Claims. (Cl. 207—10)

This invention relates to cold metalworking processes, and more particularly to an extruding method of manufacturing tubing sections having increased wall thicknesses at their ends for attachment purposes and the like, and apparatus for performing the method.

The invention is not limited to, but will be found unusually useful in connection with the manufacture of aluminum or mild steel tubing where it is desirable to maintain a thin tubing wall intermediate tubing section ends while an increased wall thickness at the ends may be required for attachment or other purposes. Such thin walled tubing is required for economy's sake where expensive metals such as aluminum are involved. In making a string of tubing including such tubing sections, it will be desirable to make increased wall thicknesses at both ends of each tubing section to permit machining of attachment screw threads thereat or other configurations for attachment purposes.

It has heretofore been impossible to vary the wall thickness of tubing by conventional extrusion methods. For this reason, a separate step of upsetting the ends of straight extruded tubing sections has been required to increase the wall thickness thereat. This manufacturing step is both time consuming and expensive. In addition, uniformity from one tubing section to the next, using mass production technique is difficult to obtain. Still further, the strength of the tubing is reduced by the upsetting process.

It is therefore an object of the invention to provide a method of mass producing metal tubing sections successively and uniformly with increased wall thickness at the ends of the tubing, each tubing section being extruded in one strong integral piece.

It is another object of the invention to provide apparatus for performing the method of the invention by extruding tubing sections with increased wall thickness at the tubing ends.

The invention achieves these and other objects and overcomes the above-described and other disadvantages of the prior art by providing an extrusion method for use with apparatus including a female die simply in the form of a hollow cylinder, and a male die having a base portion and a mandrel of a diameter smaller than the hollow cylinder, the mandrel having a still further reduced diameter at one end of the hollow cylinder. Annular metal billets are then extruded from an outside diameter larger than the hollow cylinder, whereby the billets, when confined externally, can be extruded into a tube having a relatively thin thickness compared to the starting size of the annular billet. The method of the invention includes the steps of pressing one of the billets into the space between the mandrel and the hollow cylinder, and simultaneously moving the mandrel into the hollow cylinder until its reduced diameter portion is entirely within the cylinder. Thus, the reduced diameter portion of the mandrel actually causes one end of the tubing to have an increased wall thickness.

It is an advantage of the invention that uniformity between successive tubing sections made with the same dies may be more easily achieved than in the upsetting process of the prior art. In addition, the fact that the tubing section is integral and the ends are not upset makes the tubing sections made in accordance with the invention stronger than those of the prior art wherein the upsetting manufacturing step has been required. The single extruding method of the invention is also obviously more economical to practice than the separate upsetting process employed in the prior art.

According to a feature of the invention tubing sections are successively mass produced with integral thick wall sections at both ends by repeating the steps of pressing a first billet into the space between the mandrel and the hollow cylinder until the reduced diameter portion of the mandrel is entirely within the cylinder, but only to an extent such that a selected portion of the billet remains to be extruded; inserting a second billet between the base portion of the male die and the remaining portion of the first billet; and pressing the second billet against the first billet until the first billet is extruded through the space between the mandrel and the hollow cylinder and the reduced diameter portion of the mandrel is entirely within the hollow cylinder; and continuing the pressing step but only until a selected portion of the second billet remains to be extruded, whereby the rear end of the first tubing section is extruded with an increased wall thickness at the same time the forward end of the second tubing section is extruded with an increased wall thickness.

The above-mentioned and other objects and advantages of the present invention will be better understood when considered with the following description taken in connection with the accompanying drawings made a part of this specification, wherein an embodiment is illustrated by way of example. The device of the present invention is by no means limited to the specific embodiment illustrated in the drawings since it is shown merely for purposes of description.

Fig. 6 is a sectional view of the apparatus in the position shown in Fig. 4 with a first tubing section partially extruded and a second cylindrical billet going into a hollow cylindrical female die for extrusion;

Fig. 7 is a sectional view of the apparatus similar to that shown in Fig. 5 with the rear end of the first tubing section extruded and a portion of the forward end of a succeeding section extruded;

Figures 1, 2, 3:
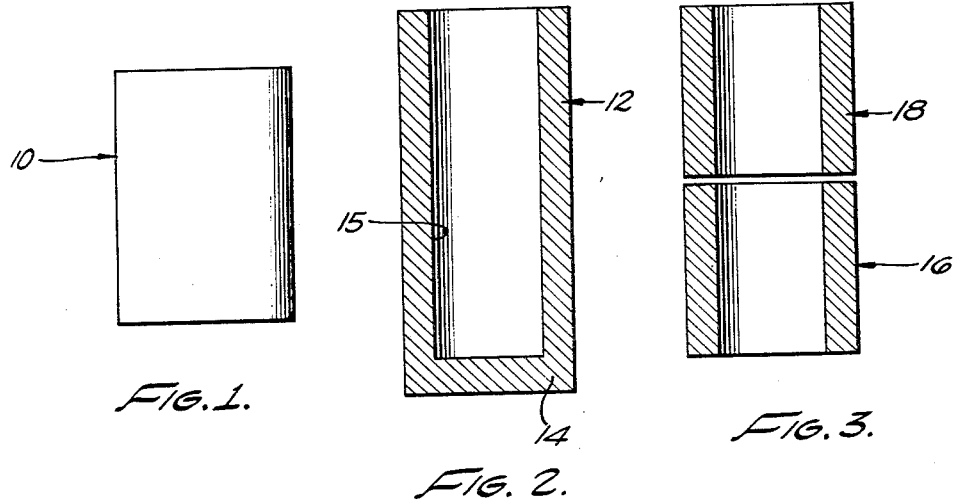
Fig. 1 is a side elevational view of a cylindrical metal billet from which the tubing sections of the invention are to be made.
Fig. 2 is a sectional view of a hollow cylindrical impact extrusion of the billet shown in Fig. 1.
Fig. 3 is a sectional view of two hollow cylindrical billets made by cutting the end off the impact extrusion shown in Fig. 2 and cutting it in half.

In the drawing, in Fig. 1, a solid cylindrical metal billet 10 is shown in a side elevational view. The billet 10 is extruded into a hollow cylindrical form as indicated at 12 in Fig. 2 having a closed end at 14. The impact extrusion 12 is made in a conventional manner by locating billet 10 in a hollow cylindrical die and forcing a mandrel into the billet to form a hollow bore 15 inside the extrusion 12 as shown in Fig. 2. After the extrusion 12 has been made, it is cut into first and second hollow cylindrical billets 16 and 18 with the closed end 14 removed. It is from the first and second hollow cylindrical billets 16 and 18 that tubing is made in accordance with the method of the invention.

Figure 4:
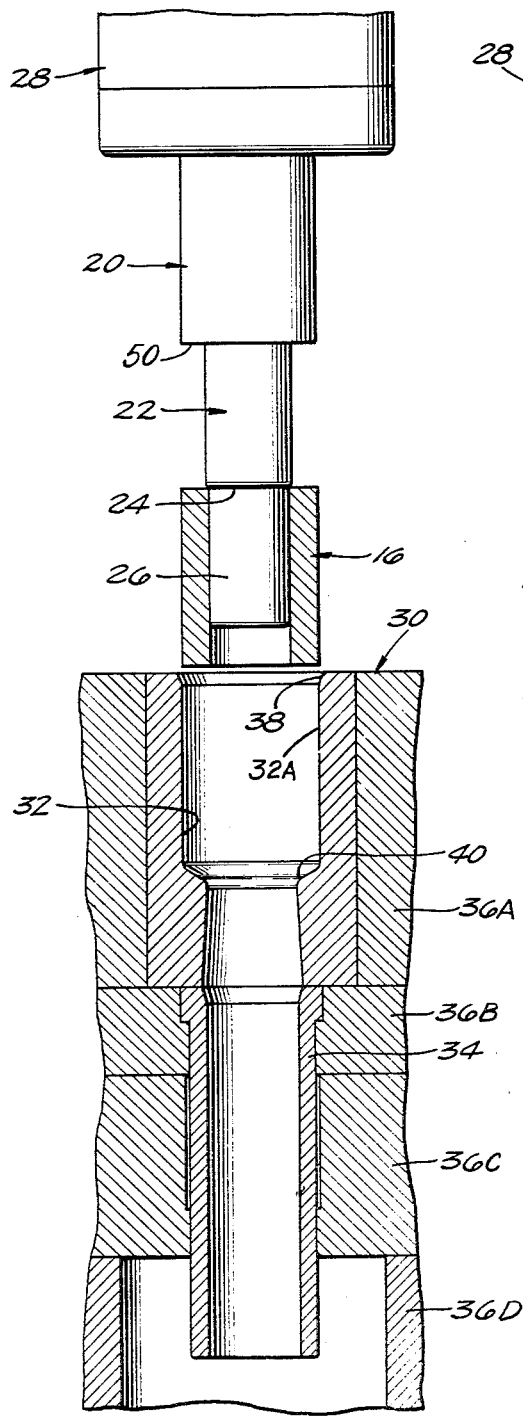
Fig. 4 is a broken away sectional view of apparatus for performing the method of the invention.

Apparatus for use in the method of the invention is shown in Fig. 4 including a punch 20 having a mandrel 22 fixed to its lower end, mandrel 22 having a shoulder at 24 at one end of a reduced diameter portion 26. Punch 20 may be conveniently operated by a press 28 most of which is broken away.

A female die is indicated at 30 having a first portion 32 and a second portion 34 axially aligned with varying diameter hollow bores. Portion 32 is located in a section 36A of die 30. Portion 34 is located in sections 36B and 36C of die 30; and protrudes into section 36D of die 30. Portion 32 has a flare at its upper end 38 to facilitate movement of a billet into the interior of portion 32. Portion 32 has a reduced diameter at 40 for extruding tubing. Both portions 32 and 34 below 40 simply facilitate movement of the tubing downwardly as viewed in Fig. 4 after it has been extruded.

Figure 5:
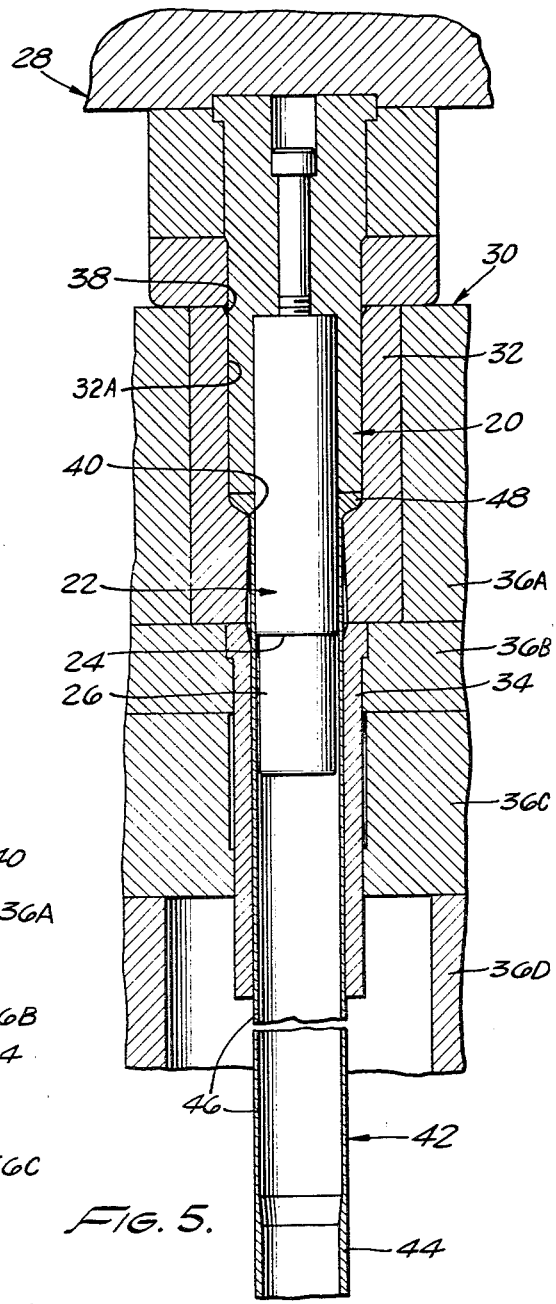
Fig. 5 is a sectional view of the apparatus shown in Fig. 4 with most all of a single tubing section extruded.

According to the first step of the invention, billet 16 is dropped into a cavity 32A of cylindrical portion 32. Punch 20 is then lowered into female die 30 to extrude a section of tubing 42 as indicated in Fig. 5 with a relatively thick wall section at its lower end 44 and a relatively thin wall at a section 46 intermediate its ends. It is a feature of the invention that the use of the reduced diameter portion 26 on mandrel 22 permits the extrusion of lower end 44 with a relatively thick wall. However, it is also another important feature of the invention that a succeeding tubing section may be extruded with a relatively thick wall at one end at a time immediately succeeding the complete extrusion of a preceding billet and during the time that mandrel 22 is moved continuously to its lower limit of travel as shown in Fig. 5. That is, it is a feature of the invention that the rear end indicated at 48 in Fig. 5 of tubing section 42 may be extruded with a relatively thick wall at the same time that the forward end of a succeeding billet is extruded into a tubing section of a relatively thick wall. For this reason, material is left at 48, not yet extruded. Punch 20 is then withdrawn from female die 30 and the second hollow cylindrical metal billet 18 is placed in cavity 32A. The reduced diameter portion 26 of mandrel 22 then extends down into the interior of the rear end or upper end of tubing 42 as indicated at 48. Thus, the rear or upper end of tubing section 42 is extruded with a relatively thick wall as indicated at 54 at the same time i.e., during the continuous movement of mandrel 22 in its downward vertical stroke, that a forward or lower end of a succeeding tubing section is extruded with a relative thick wall at 56. A dotted line 50A indicates the separation between the material of billet 18 and the material of extruded tubing 42. Of course, since both billets 16 and 18 are cold worked, they are not welded at their adjacent ends indicated by the separating line 50A. The finished product of billets extruded in accordance with the method of the invention is indicated at 42 in Fig. 8 having enlarged left and right ends 54 and 44 which may have external and internal threads cut in them respectively at 64 and 66 as shown in Fig. 9.

Thus, summarizing the operation of the apparatus of the invention, metal billet 16 is placed in a cavity 32A of female die 30 and punch 20 is pressed into female die 30 until shoulder 50 engages the upper end of billet 16, as viewed in Fig. 4. The inside diameters of billets 16 and 18 are generally sufficiently large to fit loosely around the large diameter portion of mandrel 22 although this is not absolutely necessary. To this time, no extrusion will take place. Then, as punch 20 is pressed further into female die 30, billet 16 will be extruded into tubing section 42, as indicated in Fig. 5, with its lower end of a wall thickness greater than that of the wall section 46. It is the essence of the invention that material 48 of billet 16 be left in female die 30 and punch 20 withdrawn. After the foregoing steps have been performed, the method of the invention involves the performance of the additional steps of placing a second metal billet 18 into female die 30 with its end abutting the upper end portion 48 of metal billet 16 and again pressing punch 20 into female die 30 with shoulder 50 abutting the upper end of metal billet 18 and continuing the application of pressure to cause portion 48 of metal billet 16 to be extruded and to cause the end 56 of metal billet 18 to be extruded during the same stroke of punch 20 but during non-overlapping successive periods of time. Still further, although pressure periodically may be taken off of punch 20, it is an advantage of the invention that the pressure from punch 20 be continuous to cause second metal billet 18 to be extruded in exactly the same manner as the first metal billet 16. Both may have a shape the same as that shown in Fig. 8. Thus, not only is punch 20 pressed into female die 30 to cause portion 54 of tubing section 42 to have a wall thickness greater than that of integral adjoining section 46 but punch 20 is also pressed into female die 30 to the extent shown in Fig. 5 to cause metal billet 18 to be extruded into tubing of substantially the same shape as that of tubing section 42 with a lower end having a wall thickness greater than that of an integral adjoining tubing section.

As is the case of conventional continuous extrusion presses, of course the lower end of female die 30 is maintained opened to the atmosphere so that tubing sections are automatically pushed from female die 30 by the succeeding billet. Of course, continuous extrusion dies are entirely conventional and are called "continuous" extrusion dies to distinguish them from "impact" extrusion dies. As shown in Fig. 7, tubing section 42 will, in fact, be pushed completely through and outwardly of female die 30 as metal billet 18 is being extruded to the length of tubing section 42 shown in Fig. 5.

Figure 8:
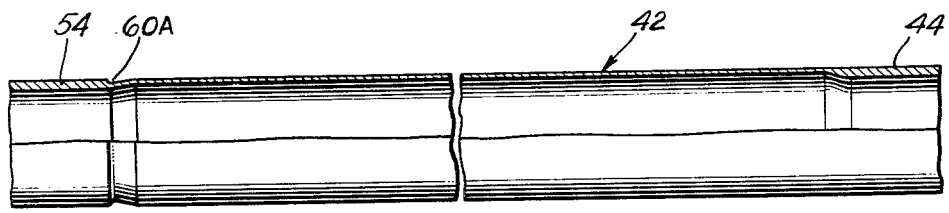
Fig. 8 is a broken side elevational view partly in section of tubing made in accordance with the invention.
Figure 9:
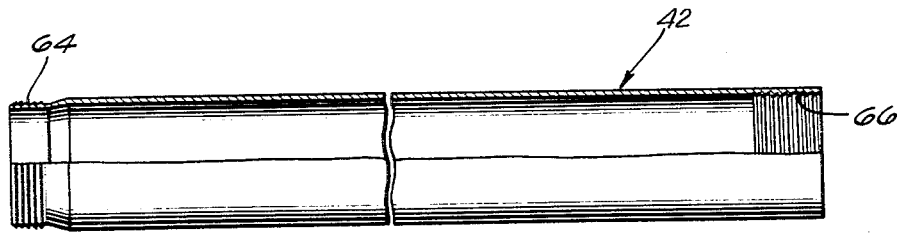
Fig. 9 is a broken side elevational view partly in section of the tubing shown in Fig. 8 machined at each end for construction of a string of tubing sections connected together.

The outside diameter of portion 54 having a relatively thick wall, as shown in Fig. 8, will be substantially equal to that of the intermediate thin wall section and the thick wall end portion 44. This for the reason that portion 48 of the material of billet 16, which is not extruded in the step indicated in Fig. 5, will be extruded between the portion 52 of mandrel 22 shown below dotted line 50A in Fig. 7 and reduced diameter portion 40 of female die 30, the reduced diameter 40 always determining the outside diameter of not only end portion 44 and the intermediate thin wall portion, but also the end portion 54.

It is true that during the extrusion of portion 54 of tubing section 42, as shown in Fig. 8, a slight circumferential indentation 60A will be produced because the remaining material 48 of billet 16, as shown in Fig. 5, will tend to flow toward reduced diameter portion 26 and therefore partially collapse until the material 48 actually reaches the surface of reduced diameter portion 26. However, this weakness in the tubing is of very little consequence due to the fact that the tubing is made with integral ends which may be threaded as shown in Fig. 9. Still further, the indentation 60A makes the construction of flush joint tubing a very simple matter and in many cases is an advantage rather than a disadvantage.

From the foregoing, it can be seen that what has been heretofore impossible with conventional extrusion methods has been made practicable by the new extrusion method of the invention. By making the thicker tubing sections 54 and 44 of tubing 42 simultaneously as the tubing is extruded, the time consuming and expensive upsetting process of the prior art, necessary to produce this type of thicker wall section at the end of the conventional extruded tubing sections, has been obviated. A still further advantage of the invention is that unusually good uniformity between successive tubing sections produced with the same die is accomplished. Still further, the strength of the tubing 42 with thicker wall sections at the ends 54 and 44 is made stronger than thicker wall sections at the ends of conventional extruded tubing made by upsetting processes, the upsetting processes necessarily weakening the ends of the tubing. It is also obvious that the single extruding step employed in the method of the invention is more economical to practice than a separate upsetting process employed in the prior art.

Although the invention is primarily adapted for the extrusion of aluminum, it may be employed in the manufacture of other suitable materials. It is to be understood that all the metal working processes disclosed herein are cold working processes and for this reason are easy and economical to perform. Similarly, as indicated in Fig. 7 wherein the rear end of first tubing section 42 is extruded at the same time as a forward section 56 of billet 18, no problem of the mutually adjacent ends 54 and 56 being welded together exists because the metal is cold worked.

Although only one specific embodiment of the invention has been shown and described, other changes and modifications will, of course, suggest themselves to those skilled in the art. The invention is therefore not to be limited to the specific embodiment shown and described, the true scope of the invention being defined only in the appended claims.

What is claimed is:

1. The method of extruding thin-walled metal tubing, the ends of which are thickened, comprising the steps of: placing a first tubular open-ended billet in the cylindrical cavity of a work material container, said cavity being axially in alignment with and immediately adjacent to an extrusion die; pushing a mandrel through the opening through said billet and the opening of said die, said mandrel having a portion of small diameter ending at the mandrel free end and an adjoining portion of larger diameter which is secured to the end of a ram, said ram having a sliding fit with the walls of said cavity, both of the mandrel portions being of smaller diameter than said opening of said die, the length from the junction of said portions to the end of said ram being less than the overall length of the billet; advancing said ram so that the metal of said billet flows through the orifice between said opening and said portion of small diameter thus extruding a first thickness of a first tubing; continuing to advance said ram so that said portion of larger diameter replaces said portion of small diameter in said opening thus extruding a second thickness of said first tubing thinner than said first thickness; withdrawing said ram just before the last of said first billet is forced to flow from said cavity; inserting a second billet in said cavity, said second billet being substantially identical to said first billet; repeating the preceding method steps whereby the last extruded end of said first tubing is thickened and is expelled by the leading end of a second similar tubing extruded from said second billet, the thickness of said leading end and said last extruded end being substantially the same, and whereby the thus completed first tubing is substantially the same outside diameter along its axial length.

2. The method of extruding thin-walled metal tubing, the ends of which are thickened, comprising the steps of: placing a first tubular open-ended billet in the cylindrical cavity of a work material container, said cavity being axially in alignment with and immediately adjacent to an extrusion die; pushing a mandrel through the opening through said billet and the opening of said die, said mandrel having a portion of small diameter ending at the mandrel free end and an adjoining portion of larger diameter which is secured to the end of a ram, said ram having a sliding fit with the walls of said cavity, both of the mandrel portions being of smaller diameter than said opening of said die, the length from the junction of said portions to the end of said ram being less than the overall length of the billet; advancing said ram so that the metal of said billet flows through the orifice between said opening and said portion of small diameter thus extruding a first thickness of a first tubing; continuing to advance said ram so that said portion of larger diameter replaces said portion of small diameter in said opening thus extruding a second thickness of said first tubing thinner than said first thickness; withdrawing said ram just before the last of said first billet is forced to flow from said cavity; inserting a second billet in said cavity, said second billet being substantially identical to said first billet; repeating the preceding method steps whereby the last extruded end of said first tubing is thickened and is expelled by the leading end of a second similar tubing extruded from said second billet, the thickness of said leading end and said last extruded end being substantially the same, and whereby the thus completed first tubing is substantially the same outside diameter along its axial length except for a reduced diameter indentation which is formed between said second thickness of said first tubing and said thickened last extruded end.

References Cited in the file of this patent

UNITED STATES PATENTS

| | | |
|---|---|---|
| 1,664,976 | Hanff | Apr. 3, 1928 |
| 1,854,411 | Leighton | Apr. 19, 1932 |
| 2,639,809 | Perry et al. | May 26, 1953 |
| 2,810,478 | Sejournet et al. | Oct. 22, 1957 |
| 2,819,794 | Krause | Jan. 14, 1958 |

FOREIGN PATENTS

| | | |
|---|---|---|
| 898,884 | Germany | Dec. 7, 1953 |
| 154,770 | Australia | Jan. 14, 1954 |
| 744,313 | Great Britain | Feb. 1, 1956 |